3 Sheets--Sheet 1.

A. BROADNAX.

Apparatus for Rendering Lard, Tallow, &c.

No. 5,925. Reissued June 23, 1874.

*Fig. I.*

*Witnesses,*
J. B. Mayo
C. Delafield

*Inventor.*
Amos Broadnax

3 Sheets--Sheet 2.

A. BROADNAX.

Apparatus for Rendering Lard, Tallow, &c.

No. 5,925. Reissued June 23, 1874.

*Fig II.*

*Witnesses,*
J. B. Mayo.
C. Delafield.

*Inventor.*
Amos Broadnax

A. BROADNAX.

Apparatus for Rendering Lard, Tallow, &c.

No. 5,925. Reissued June 23, 1874.

*Witnesses:*

J. B. Mayo.
C. Delafield

*Inventor:*

Amos Broadnax

BEST AVAILABLE COPY

UNITED STATES PATENT OFFICE.

AMOS BROADNAX, OF MONT CLAIR, NEW JERSEY.

IMPROVEMENT IN APPARATUS FOR RENDERING LARD, TALLOW, &c.

Specification forming part of Letters Patent No. 81,743, dated September 1, 1868; reissue No. 5,925, dated June 23, 1874; application filed June 16, 1874.

*To all whom it may concern:*

Be it known that I, AMOS BROADNAX, of Mont Clair, in the county of Essex and State of New Jersey, have invented certain new and useful Improvements in Apparatus for Rendering Lard and Tallow and other animal matter, and for crisping or drying the scrap or refuse thereof; and I do hereby declare the following to be a full, clear, and exact description of my said invention, reference being had to the annexed drawing making part of this specification, in which—

Figure 1:
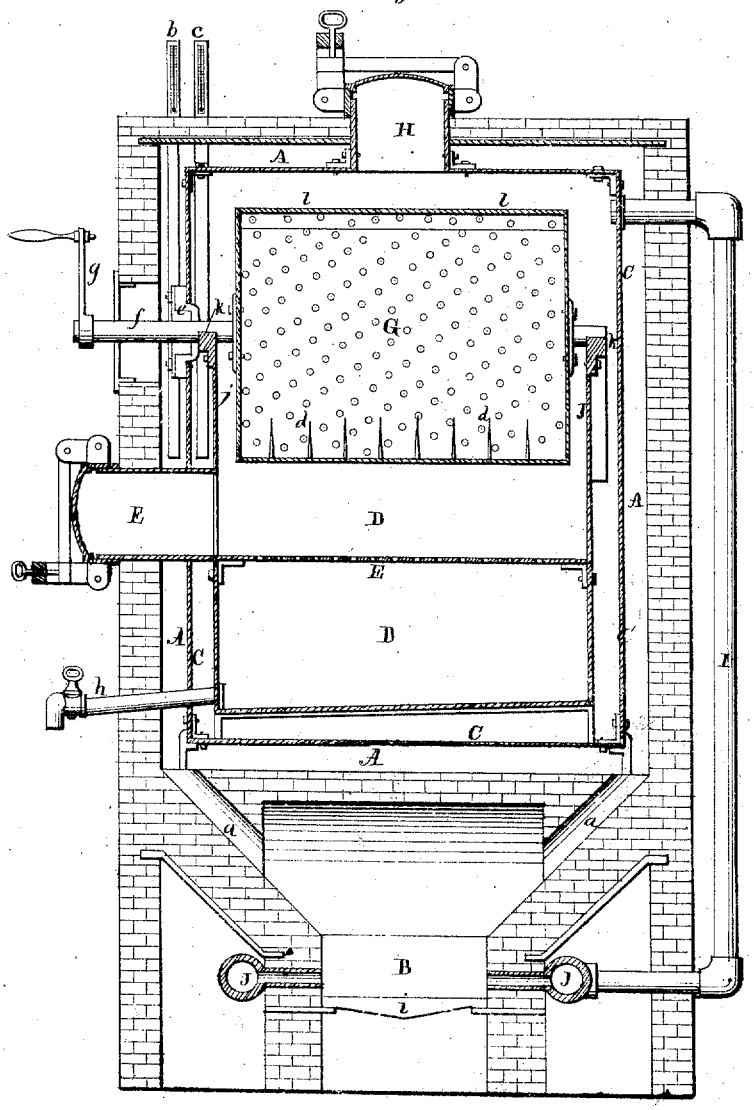
Figure 2:
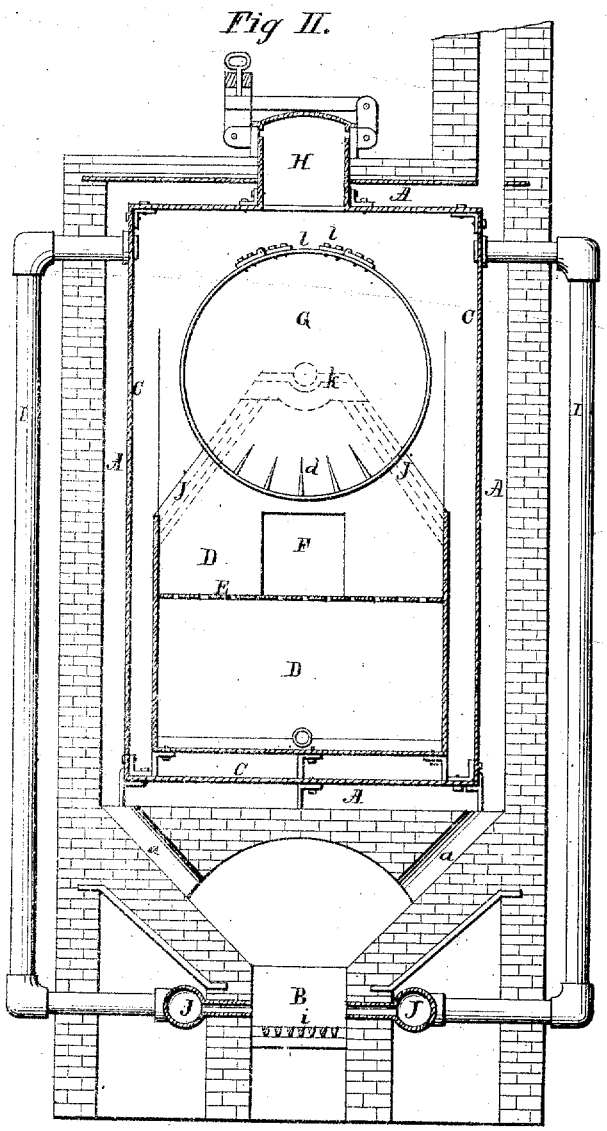
Figure 3:
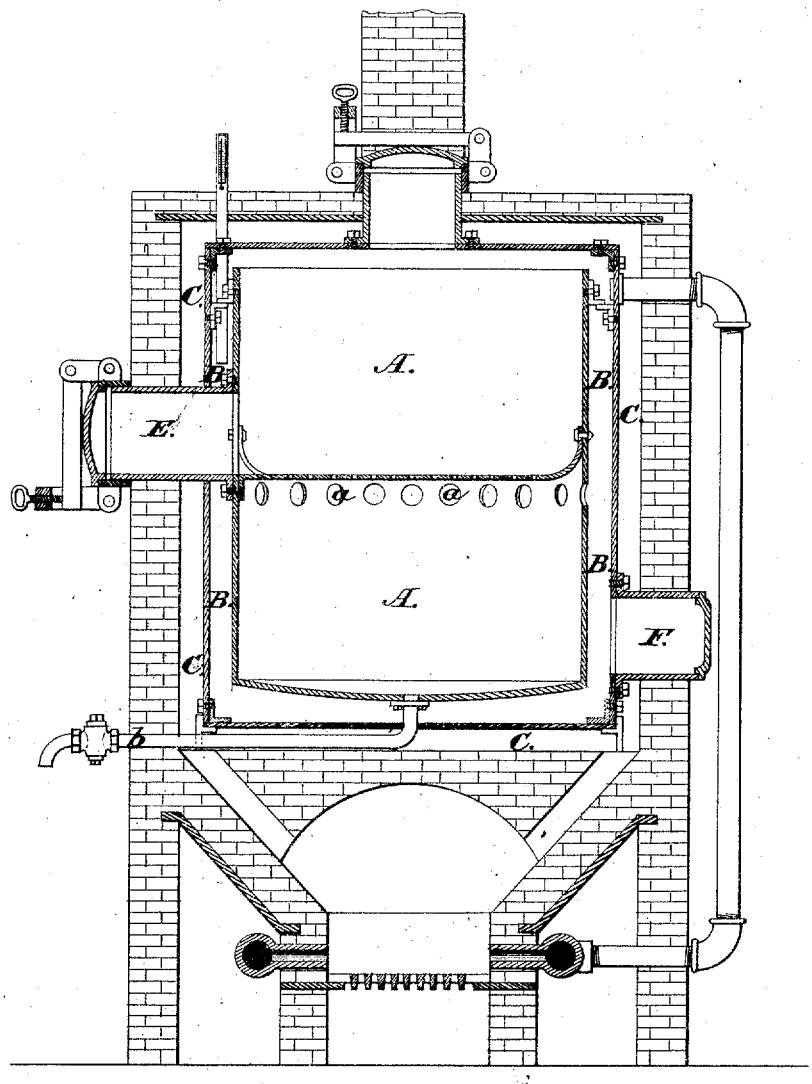

Figure 1 is a longitudinal vertical section, and Fig. 2 a transverse vertical section, through one form of my apparatus, and Fig. 3 a vertical section through another form thereof, the two forms embracing the several and essential principles of my invention.

My invention, as illustrated in Figs. 1 and 2, consists of a tight stationary tank, confined in a close stationary chamber, filled with an atmosphere of heat or caloric in some suitable form and of sufficient temperature to render or dry the matter under treatment, said tank to be fitted with a horizontal rotating stirrer, so constructed and arranged with reference thereto, that the material under treatment may be thrown over and over while it is being rendered or dried, the apparatus to be so constructed, in case of need, that the matter under treatment can be rendered or cooked, the rendered fat and water, or either of them, drawn off, and the scrap or refuse dried or crisped, without opening the manholes of the tank so as to make a nuisance; and my said invention consists also of a combination of said tank with a covered or reverberatory furnace, constructed to concentrate and retain the heat for the more effectual consumption of the gases and vapors developed in the operation, as will be hereinafter more fully described. My invention, as illustrated in Fig. 3 of the drawing, consists of a tight chamber, C, composed of brick or metal, as may be required, and of a tight metal chamber, B, set inside of the chamber C, in the manner substantially as shown, and of an open or closed tank, as the case may require, (shown by A,) set inside of the chamber B. The tank A is divided by a perforated partition-plate, D, and is fitted with a man-hole, E, to discharge the refuse after the rendering or drying is completed.

In the drawing the partition-plate is set about in the center of the tank, measuring from top to bottom thereof, but it may, of course, be set higher or lower, as the case may require. It should be adjusted, however, with reference to the bottom of the tank or draw-off pipe and reservoir, to leave room for all of the fat or water to drain clear of the scrap or refuse on the plate. The tank is charged through a man-hole made in the top of the chamber B, and this chamber is cooled by opening the man-hole F, all of the man-holes being fitted with the usual mountings to keep them tight. The chamber C is made over a furnace precisely the same as in Figs. 1 and 2, the furnace being made the same, and the method of deodorizing or consuming the gases and vapors in the furnace is also the same.

This apparatus differs from that shown by Figs. 1 and 2, in this: That here the material is rendered or otherwise treated without being stirred, while in the other it may be kept constantly in motion or left at rest during part of the process.

In the original patent granted for this invention there are various forms and additions shown in the drawing and described in the specification; but it does not seem to be necessary to embrace in this amended specification all these forms, details, and additions. They merely show some of the forms and methods of application, of which the invention is susceptible; but Figs. 1, 2, and 3 of the drawing embody the essential principles of the invention, and show a practical method of its application, although, perhaps, not the best method which experience may suggest. I shall, therefore, omit from this specification, and the drawing making part hereof, all the figures of the old drawing, but these three, leaving the mechanic or engineer to adopt the best forms and details suggested by experience, or which may be best adapted to fill the various conditions or circumstances that may attend the use of the invention.

In this drawing, Fig. 1 is a longitudinal vertical section, and Fig. 2 a transverse vertical section, through a stationary chamber, A, made of brick or metal, as the case may require, and through a stationary steam-tight tank, C, set in said chamber, and through a horizontal rotating stirrer, G, arranged in said tank, and hung on centers in the tank over a pan, D, which pan, however, may be omitted in case it is found unnecessary, as it probably will be, it being placed in the tank merely as a measure of precaution against the possibility of burning the fat when fire is used for melting; but if steam be applied to the apparatus, or used in it, for melting or drying, instead of fire, or in addition to the fire, the pan will, of course, be omitted. Under the bottom of the chamber A a covered furnace, B, is made, with a series of flues, *a*, leading from the sides thereof, a short distance below the cover or arch, by which a closed chamber is formed in the top of the furnace above the flues, in which the heat is concentrated to insure a more effectual consumption or deodorization of the gases or vapors evolved in the process. The tank C is made in the same form substantially as the chamber A, only smaller by some six to ten inches, the tank being arranged in the chamber to leave a flue or open space on all sides of it from four to six inches wide; the tank being set in metal mountings, arranged in relation to the flues *a a* to divide the heat from the furnace, causing a portion of it to flow under the tank, and a portion up around the sides and over the top thereof. The tank and chamber may, of course, be made rectangular or cylindrical, as the case may require. If the apparatus is to be used without pressure on or in the tank the rectangular form may be used; but if steam-pressure is to be employed the cylindrical form is best, that being the most economical, as well as strongest, and if steam is to be used the furnace need not necessarily be placed under the apparatus, or made a part of it; but if the steam and gases are to be consumed or deodorized this furnace is a necessary adjunct of the apparatus, whether the material be treated with fire, or steam, or both. The tank is fitted with manholes H and F, and the usual mountings to keep them tight, the tank being charged through the hole H, and discharged of the refuse by the hole F. The stirrer G is supported upon gudgeons *x* in bearings K bolted to the end plates of the pan D, which extend up and are stiffened with angle-iron, as shown by *j*. In case the pan be omitted, however, the bearings of the stirrer should be bolted to the inside of the tank, one of the gudgeons being made long enough to reach through to the outside of the heating-chamber, the shaft being made with a stuffing-box, *e*, to make it tight where it passes through the tank and chamber, and with a crank or other suitable device to which power can be applied to rotate it. The stirrer G is made of boiler-iron, in the form of a cylinder, the sides or ends of which should be perforated, and which should be fitted with doors *l l*, or a man-hole plate hinged to the shell of the cylinder, and secured in any convenient way to open downward when the fastenings are cast off and the stirrer turned to bring the doors on the lower side thereof, thus dumping the scrap out in the tank on the perforated plate E, or in the bottom of the tank in case the plate E be omitted.

The stirrer is also fitted with a row of prongs, *d d*, set in the inside thereof opposite the doors, or in some other position where they will be least in the way, for the purpose of catching the fat or scrap, the more effectually to break it up and turn it over, and bring it in contact with the free heat in the tank.

The object of the perforated partition-plate E, Figs. 1 and 2, is to keep the dirt and fine particles of tissue from falling to the bottom of the tank in the fat, and choking the draw-off pipes *h h*. It may be set higher or lower, as the case may require, or it may be omitted, but it should be set, in case it is retained, on about the same plane with the nozzle F, to facilitate the removal of the scrap.

The drawing shows the plate E set in the pan D, but if the pan be omitted the plate must, of course, be secured in the tank in the same way precisely as in the pan, its office being the same in both cases, and its relation to all the essential parts of the apparatus being also the same.

To the top of the tank C a pipe, I, is attached, leading down and connecting to a pipe, J, which last-mentioned pipe is set in the wall, forming the furnace B, the grate-bars of which are shown by *i*. This pipe J is made to surround the furnace on all sides, excepting that part occupied by the furnace-doors, and it is fitted with a series of jet-pipes leading through the walls to the furnace, the pipe being set in the walls to keep it from getting too cool, and from burning out. The pipe is made of metal, though it may be made of fire-tile, and set in the wall of the furnace in the same way.

The pipe I should be fitted with cocks, and should be about two and a half inches internal diameter, and it is better the pipe J should be about twice that diameter, and the aggregate area of all the jet-pipes should be twice that of the pipe J, that the steam and gas from the tank may expand in the pipes and flow into the fire with a constantly decreasing velocity.

The operation of the apparatus shown by Figs. 1 and 2 is as follows: The rough fat or other material to be treated is put into the cylindrical stirrer G. Fire is then made in the furnace, the heat of which ascends and envelopes the tank C on every side, and through it the heat is radiated upon the fat or matter under treatment. As the rendering or drying proceeds, the stirrer G should be made to rotate to break the mass of material under treatment, and expose the different parts thereof to the heat, the prongs *d* keeping the stirrer from slipping around the material, throwing it over, tumbling and breaking the mass, and admitting the heat to the interior thereof.

The melted fat and water, as the process advances, runs off in the bottom of the tank, leaving the scrap thoroughly drained when the rendering or crisping is completed, and as soon as the melted fat and water are drawn off the scrap or refuse is ready to dry, which is done by keeping the heat on the tank and the stirrer revolving until the water is driven out.

As soon as the material is sufficiently dried the doors *l l* of the stirrer are opened, and its contents deposited upon the diaphragm-plate, or in the bottom of the tank, from which it is removed through the nozzle E.

If the material is to be treated without pressure the pipe I should be kept open to allow the steam and gas to flow into the furnace as fast as they are driven off by the heat. But if the material is to be treated under pressure, the pipe I should be closed until the necessary pressure is obtained, when the pipe should be opened just wide enough to maintain the desired pressure.

In treating fat, a low pressure should be used, but in treating offal the process will be expedited by more pressure, according to the material under treatment.

The apparatus should, of course, be made with reference to the pressure it is to bear. When it is intended to work under pressure the tank should take the cylindrical form.

The operation of the apparatus shown by Fig. 3 is the same as the other, excepting the stirring, the material being simply put in the tank, the chamber closed, and fire applied in the furnace.

It is apparent that heat may be applied through the agency of steam in place of fire, and that the stirrer, instead of being made in the form of a cylinder, may take some other form. Indeed, the whole invention may take a variety of forms, as above stated; but it will be seen that the essential features of the invention are, first, a stationary tank inclosed in a stationary heating-chamber, and fitted with a horizontal rotating stirrer, by which the material under treatment is turned over and over while it is being rendered or dried; second, the arrangement of said chamber, tank, and stirrer in relation to each other, substantially as described, by which the material is rendered and the refuse dried in one continuous process in the same apparatus; third, the combination, with a rendering apparatus, of a covered furnace formed to make a hot-chamber under the cover, and above the flues leading from the furnace; fourth, an expansion-pipe set in the walls of the furnace, and fitted with jet holes or tubes, by which the steam and gas are expanded on their way to the furnace, the pipe protected from the extremes of cold and heat, and the steam and gas distributed evenly over the surface of the fire; fifth, an open rendering-tank divided by a perforated partition-plate, arranged to let the melted fat and water drain off as fast as liberated, arranged inside of a closed or tight chamber set in a heating-chamber, to which the fire or heat can be applied to render or dry the material under treatment.

These are the points of my invention. Whatever form the apparatus or its various parts may take, or in whatever form the heat may be applied, or however the furnace may be combined with the apparatus, or the expansion-pipe may be set in the walls of the furnace, the claim being to the substance and not the mere form of the invention.

I claim, therefore, separately or in combination, and desire to secure by Letters Patent—

1. A stationary tank inclosed in a stationary heating-chamber, and fitted with a horizontal rotating stirrer, by which the material under treatment is thrown over and over while it is being rendered or dried.

2. A tank, C, combined with a heating-chamber, A, and a stirrer, G, arranged and operated in relation to each other, to render the material and dry the refuse as parts of one process.

3. The combination, with a rendering apparatus, of a covered furnace, formed with a hot-chamber under the cover, and above the flues leading from the furnace, for the more effectual consumption of the gases.

4. An expansion-pipe set in the walls of the furnace, and fitted with jet-holes or tubes, by which the steam and gas are expanded on their way to the furnace, the pipe protected from the extremes of cold and heat, and the steam and gas distributed evenly over the surface of the fire.

5. An open rendering-tank divided by a perforated partition-plate arranged to let the melted fat or water drain off as fast as liberated, said tank to be arranged inside of a tight metal chamber, inclosed in a heating-chamber, made of brick or metal, and to which the heat can be applied to render the material under treatment, substantially as described.

AMOS BROADNAX.

Witnesses:
J. B. MAYO,
C. DELAFIELD.